Patented Feb. 4, 1930

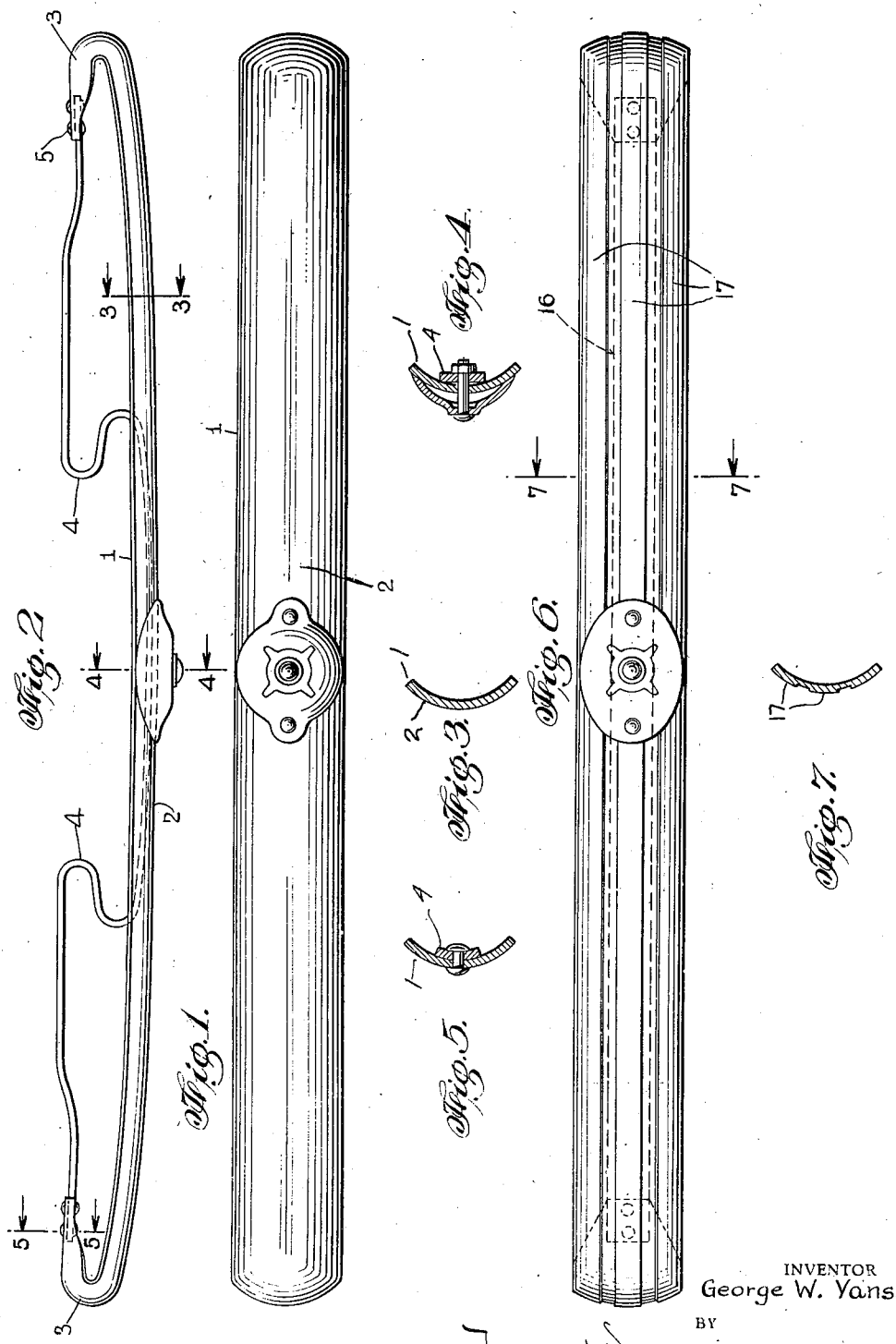

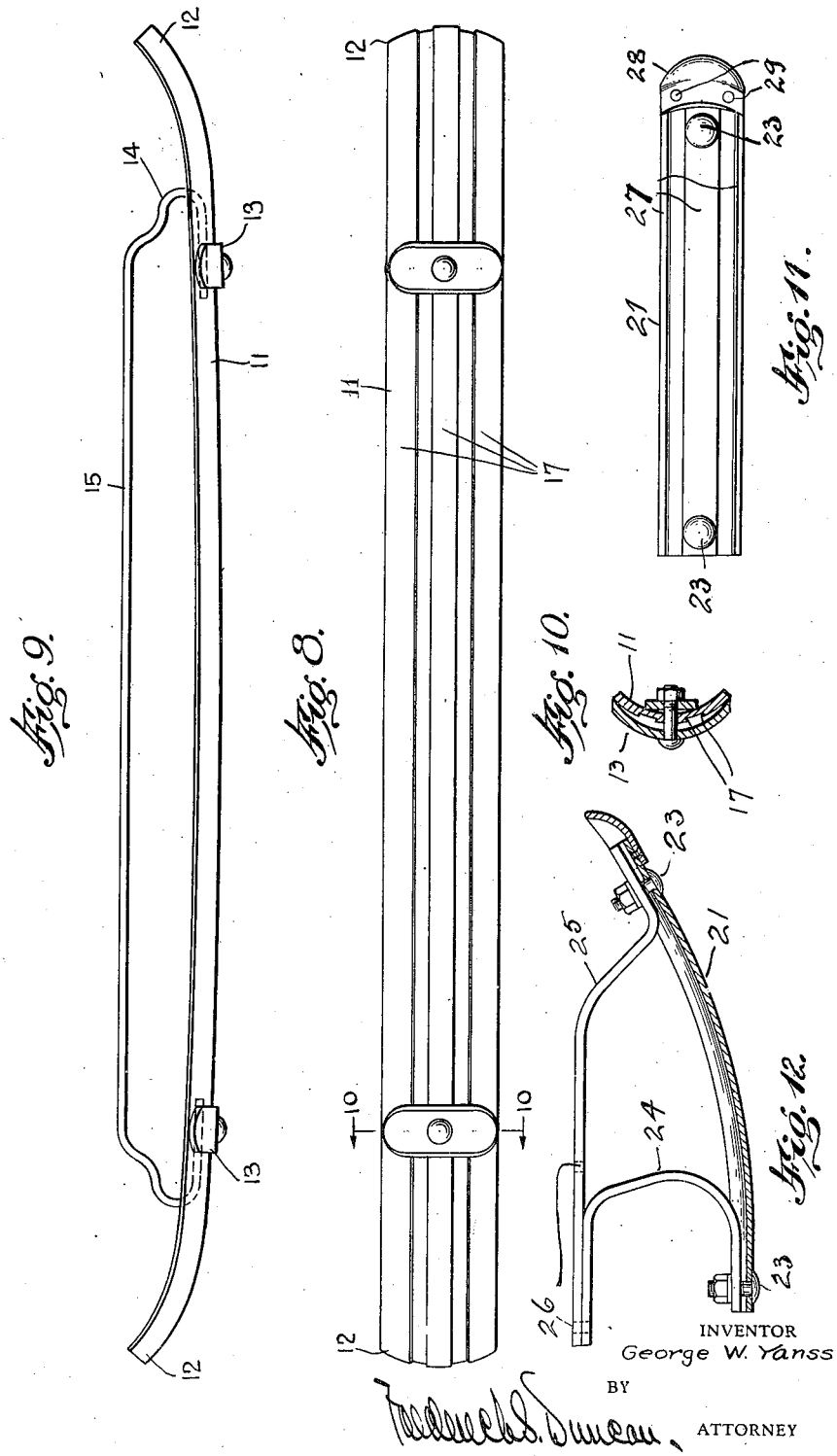

1,745,966

UNITED STATES PATENT OFFICE

GEORGE W. YANSS, OF ADRIAN, MICHIGAN, ASSIGNOR TO AMERICAN CHAIN COMPANY, INC., A CORPORATION OF NEW YORK

AUTOMOBILE BUMPER

Application filed September 21, 1927. Serial No. 220,917.

This invention relates to automobile bumpers, and has for an object the provision of a bumper which combines to a desirable extent the resiliency of a bumper fabricated of strip steel, with certain of the features heretofore considered to be exclusively characteristic of a tubular bumper, and notably the spacious curved impact surface which is presented by various types of existing oversized tubular bumpers.

In explanation of the above statement, it is to be observed that early types of tubular bumpers embodied tubes of relatively small diameter which presented an attenuated impact surface and were unsightly, and that these disadvantages were only obviated in part when parallel tubes were used. In general, tubular bumpers are more rigid than is usually desirable, if used without other shock-absorbing means.

The oversized tubular bumpers to which reference has already been made, are less unsightly, but their size is limited by an undesirable increase in the amount of material used, as the diameter is increased, adding to their expense, weight, and bulk, unless their resistance to crumpling action under impact is sacrificed by making the walls of the tubes thin.

On the other hand, the use of flat steel strips to constitute the impact members of bumpers has substantial manufacturing advantages and affords a bumper in which the desired degree of resiliency or rigidity can be readily provided for, but heretofore it has been the practice in providing a bumper made of steel strips to secure breadth of impact surface by increasing the number of steel strips arranged in the impact plane rather than to provide a single broad strip, primarily for the reason that a very broad flat strip presents an unsightly appearance.

In pursuance of the object first stated above, therefore, the present invention provides a strip of steel of considerably greater breadth than that conventionally used in bumpers of the single bar type, the bumper strip provided in accordance with this invention being preferably of concavo-convex cross-section and of such radius of curvature and breadth that when in use the bumper presents, viewed from in front or at the sides, the appearance of a tubular bumper having a spacious curved impact surface of pleasing aspect. This surface may be plain or ribbed or otherwise treated to vary the design, and it affords an extremely serviceable and effective impact area from whatever direction the shock of impact is received.

A bumper thus constructed, while semi-rigid, that is to say, more rigid than would be a flat steel strip of the same cross-section, nevertheless possesses more resiliency than does a tubular bumper member, whatever the size of the latter.

A bumper constructed in accordance with the present invention may have a curvature which causes it to present the effect of a larger bar than would be practicable with any bumper having a complete tubular section. For the same reason, a bumper of this novel construction will have a greater strength for a given weight of material employed, inasmuch as substantially all of the material may be concentrated in the portion of the bumper exposed for impact.

A further object of the invention is to provide suitable means for attaching bumpers embodying this invention to automobiles, including a supporting member which preferably takes the form of a bar suitably narrower than the impact member to be concealed thereby and having means for connecting said supporting bar with the impact member.

The above and other features of the invention are illustrated and described fully in the accompanying drawings and specification and are pointed out in the claims.

In the drawings,

Fig. 1 is a view in front elevation of a bumper in the construction of which this invention has been embodied.

Fig. 2 is a plan view of the bumper of Fig. 1.

Fig. 3 is a vertical section on the line 3—3 of Fig. 2.

Fig. 4 is a vertical section on the line 4—4 of Fig. 2.

Fig. 5 is a vertical section on the line 5—5 of Fig. 2.

Fig. 6 is a view similar to Fig. 1 of a modification.

Fig. 7 is a sectional view on the line 7—7 of Fig. 6.

Fig. 8 is a view in front elevation of a modification.

Fig. 9 is a plan view of the bumper of Fig. 8.

Fig. 10 is a view in vertical section on the line 10—10 of Fig. 8.

Fig. 11 is a view in front elevation of a fender-guard embodying the invention.

Fig. 12 is a horizontal section on the line 12—12 of Fig. 11.

In the embodiment of the invention selected for illustration and description, referring to Figs. 1 to 5 inclusive, the part designated by the reference character 1 is an impact member of an automobile bumper which may be made of any suitable material, and is preferably formed of a strip of flexible steel having in accordance with the invention a forwardly convex impact surface 2 of sufficient breadth and curvature to afford the appearance of a complete tube when observed from any position ordinarily occupied by an observer standing on the ground in the vicinity of the bumper. Preferably the breadth of this impact member is considerably greater than that of ordinary single strip bumpers, and the forwardly convex surface is preferably of approximately cylindrical contour being less than 180° in extent and of a radius substantially greater than that of conventional oversized tubular bumpers.

In its now-preferred form such an impact member may be conveniently formed by rolling a steel strip into concavo-convex cross-section, and the impact surface may be straight for a substantial portion of its length or may be bowed or otherwise formed to suit the requirements of individual installations.

The ends of the bumper are preferably of such contour as to continue the effect of a tubular bumper, and in a now-preferred form the ends are formed into loops as indicated at 3, the loops being of such curvature as to afford the desired tubular effect.

Any suitable means may be provided to support the bumper by attaching the same to a suitable part of the automobile, either front or rear, or at the sides thereof, and it will be understood that from the loop portions the material of the return portions may be extended for any desired length and secured directly by suitable attaching means to the selected portion of the automobile.

In the instance shown in Fig. 2 a supporting member 4 is provided, connected at 5 by suitable rivets to the end portions of the loops, and this rear supporting bar may desirably be considerably narrower than the impact bar, so as to be inconspicuous and may be so positioned as to be practically hidden by the impact member.

A bumper constructed as above described may be formed with any desired degree of rigidity, and will desirably have a greater degree of resiliency than any bumper of completely cylindrical or tubular cross-section.

It is to be noted that such completely tubular bumpers in general do not afford any useful degree of resiliency for many purposes, and as already noted the diameter of such bumpers is limited by the tendency to an undue increase in weight and bulk except with the sacrifice of proper thickness of walls, if the tubular bumper is to be capable of resisting the crumpling action of a shock under impact, whereas such shocks can be sustained with impunity with the structure herein described, inasmuch as the concavo-convex bars can be made of any desired thickness suitable to sustain the impacts likely to be encountered in use, and will retain their convex form uninjured after any but the most destructive shocks, while absorbing completely all the minor shocks, without injury to the vehicle or its occupants.

In the modification illustrated in Figs. 8 to 10, the ends of the main bumper member 11 have not been extended to form loops, but are simply curved rearwardly and rounded at 12 to afford the desired tubular effect.

This form of bumper is shown as provided with a supporting member 14 connected at 13 with the front member by suitable clamps, and having a spaced portion 15 by which the bumper may be connected to the automobile with suitable attaching means (not shown).

It is to be understood that this form of supporting rear member may be applied to the structure shown in Fig. 1 in place of the rear bar 4 there shown, and conversely that the bumper illustrated in Fig. 9 may have other forms of supporting bar, such as that shown at 16 in Fig. 6 which is like the rear bar shown in Fig. 2.

In Figs. 6 to 10 the bumpers are illustrated as having formed upon the impact surface a series of longitudinal ribs 17 which may be of any suitable number and contour, and which are shown in the instance illustrated as three ribs of approximately rectangular cross-section, co-extensive in length with the bumper.

These ribs may be given a different finish from that of the adjacent portions of the impact surface, as for example by japanning the latter and imparting a polished finish to the ribs.

Each of these latter forms of bumper illustrated presents the effect of a tubular bumper of generous dimensions, and at the same time can be formed of steel strip stock, rolled to the desired shape, with considerable latitude for changes in contour and ornamentation; also possessing the desirable quality of yielding resistance to shock, and capacity for gradually absorbing the same, to a much greater degree than is characteristic of any completely tubular impact member, or of any of the bumpers comprising channel bars, which are relatively rigid.

Other modifications than those illustrated may be adopted without departing from the spirit of the invention.

For example, the invention may be embodied in plural bar bumpers, such as those illustrated in my co-pending application Ser. No. 220,918; also in fender guards, a now-preferred form of which is illustrated in Figs. 11 and 12, comprising a broad impact member 21 formed of strip steel of arcuate cross-section, as indicated in Fig. 12, so that it presents a forward impact surface having the effect of a complete tube as indicated in Fig. 11, thus carrying out the purpose of the invention.

A suitable supporting member or members may be combined with the impact member, such as those shown in Fig. 12 at 24 and 25, secured to the impact member in any suitable manner, as by the bolts 23, the attaching members being shown as having bolt holes at 26 to permit ready attachment to a suitable part of the vehicle.

The bolts 23 are shown as having relatively large heads, which yield an ornamental effect, and the impact surface may desirably be ribbed as indicated at 27, for the same purpose.

If desired, the end of the impact member may be provided with a cap 28, secured thereto in suitable fashion, as by rivets 29, of such contour as to enhance the tubular effect of the guard, and it is to be noted that similar caps may be applied to certain of the forms of bumper hereinbefore described. Such caps are claimed in my co-pending application, Ser. No. 294,681.

I also wish it to be understood that any suitable means for securing together the various parts of the bumpers or fender guards may be provided in place of the rivets and bolts shown at different regions, inasmuch as the parts may be welded or otherwise secured, without departing from the spirit of the invention.

I claim:

1. An automobile bumper comprising an impact member formed of a broad strip of resilient metal in a single horizontal plane throughout its length and having a convexly curved impact surface of less than 180° in extent, but presenting the appearance of a cylindrical tube when viewed from the front thereof, said impact member being capable of bending resiliently about a vertical axis under the force of an impact.

2. An automobile bumper comprising an impact member formed of a broad strip of resilient metal presenting a convexly curved impact surface, said strip having loop ends.

3. An automobile bumper comprising an impact member formed of a broad strip of resilient metal having a convexly curved impact surface of less than 180° in extent, but presenting the apeparance of a cylindrical tube, when viewed from the front, said strip having loop ends suitably curved to maintain said tubular curved appearance when viewed toward said loops.

4. An automobile bumper comprising an impact member formed of a broad strip of resilient metal in a single horizontal plane throughout its length and having a convexly curved impact surface of less than 180° in extent but presenting the appearance of a cylindrical tube, when viewed from the front, and a supporting structure connected with said impact member and adapted to be attached to an automobile, said impact member being capable of bending resiliently about a vertical axis under the force of an impact.

5. An automobile bumper comprising an impact member formed of a broad strip of resilient metal in a single horizontal plane throughout its length and having a convexly curved impact surface of less than 180° in extent but presenting the appearance of a cylindrical tube, when viewed from the front, and a supporting bar connected with said impact member and adapted to be attached to an automobile, said supporting bar being spaced from the impact member and having its mid-portion extended toward the mid-portion of said impact member.

6. An automobile bumper comprising an impact member formed of a broad strip of resilient metal in a single horizontal plane throughout its length and having a convexly curved impact surface of less than 180° in extent but presenting the appearance of a cylindrical tube, when viewed from the front, and a supporting bar connected with said impact member and adapted to be attached to an automobile, said supporting member being spaced from the impact member and having its mid-portion extended toward the mid-portion of said impact member and connected therewith.

7. An automobile bumper comprising an impact member formed of a broad strip of resilient metal presenting a convexly curved impact surface, said strip having loop ends, and a supporting bar connected with said impact member and suitably narrower to be concealed thereby.

8. An automobile bumper comprising an impact member formed of a broad strip of resilient metal presenting a convexly curved impact surface, said strip having loop ends, and a supporting bar connected with said impact member and suitably narrower to be concealed thereby, said supporting bar being of concavo-convex cross-section.

9. An automobile bumper comprising an impact member formed of a broad strip of resilient metal presenting a convexly curved impact surface, said strip having loop ends, and a supporting bar connected with said impact member and suitably narrower to be concealed thereby, said supporting bar being of concavo-convex cross-section and having its ends connected with the ends of said impact bar.

10. An automobile bumper comprising an impact member formed of a broad strip of resilient metal presenting a convexly curved impact surface, said strip having loop ends, and a supporting bar connected with said impact member and suitably narrower to be concealed thereby, said supporting bar being of concavo-convex cross-section and having its ends connected with the return loop end portions of said impact bar.

11. An automobile bumper comprising a concavo-convex impact member formed of a broad strip of resilient metal of less than 180° in extent but having a convexly curved impact surface of suitable extent and curvature to present the appearance of a cylindrical tube, when viewed from the front, said impact member being capable of bending resiliently about a vertical axis under the force of an impact.

12. An automobile fender guard comprising an impact member formed of a broad strip of metal presenting a convexly curved impact surface of less than 180° in extent but presenting the appearance of a cylindrical tube, said impact member being capable of bending resiliently about a vertical axis under the force of an impact.

In testimony whereof, I have signed this specification.

GEORGE W. YANSS.